(12) United States Patent
Coley et al.

(10) Patent No.: US 9,262,295 B2
(45) Date of Patent: Feb. 16, 2016

(54) MULTIPLE CONFIGURATION ITEM STATUS VALUE ANALYSIS

(75) Inventors: Brett A. Coley, Wake Forest, NC (US); Niraj Joshi, Cary, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1825 days.

(21) Appl. No.: 11/774,859

(22) Filed: Jul. 9, 2007

(65) Prior Publication Data

US 2009/0019046 A1    Jan. 15, 2009

(51) Int. Cl.
G06F 7/08    (2006.01)
G06F 11/34   (2006.01)

(52) U.S. Cl.
CPC ........ G06F 11/3409 (2013.01); G06F 11/3466 (2013.01); *G06F 11/3452* (2013.01)

(58) Field of Classification Search
CPC .................................................. G06Q 10/06313
USPC .......... 707/7; 709/224, 223, 225, 226; 714/47
See application file for complete search history.

(56) References Cited

U.S. PATENT DOCUMENTS

| | | | | |
|---|---|---|---|---|
| 6,119,185 | A * | 9/2000 | Westerinen | G06F 9/4411 710/104 |
| 6,167,538 | A * | 12/2000 | Neufeld et al. | 714/47 |
| 7,657,501 | B1 * | 2/2010 | Brown et al. | 707/999.002 |
| 2002/0186238 | A1 * | 12/2002 | Sylor et al. | 345/736 |
| 2003/0046396 | A1 * | 3/2003 | Richter et al. | 709/226 |
| 2003/0061362 | A1 * | 3/2003 | Qiu | H04N 7/165 709/229 |
| 2005/0071458 | A1 * | 3/2005 | Fisher et al. | 709/224 |
| 2005/0216585 | A1 * | 9/2005 | Todorova et al. | 709/224 |
| 2006/0031509 | A1 * | 2/2006 | Ballette et al. | 709/226 |
| 2007/0005755 | A1 * | 1/2007 | Humphries | 709/224 |

OTHER PUBLICATIONS

"Guide to Computer Security Log Management"—Kent et al, NIST, Sep. 2006 http://csrc.nist.gov/publications/nistpubs/800-92/SP800-92.pdf.*

* cited by examiner

*Primary Examiner* — Randy Scott
(74) *Attorney, Agent, or Firm* — Steven M. Greenberg, Esq.; CRGO Law

(57) ABSTRACT

Embodiments of the present invention provide a method, system and computer program product for configuration item (CI) status value analysis for multiple performance monitors. In one embodiment of the invention, a multi-CI analysis method can be provided. The method can include weighting different CI status values produced by different performance monitors for a single resource in a monitored computing system and displaying selected ones of the weighted different CI status values according to relevance determined by weight. In one aspect of the embodiment, weighting different CI status values produced by different performance monitors for a single resource in a monitored computing system can include locating the different CI status values for the single resource in a configuration management database (CMDB), identifying the different performance monitors producing the different CI status values in the CMDB and applying weights to the different CI status values according to CI status value characteristics.

20 Claims, 1 Drawing Sheet

MULTIPLE CONFIGURATION ITEM STATUS VALUE ANALYSIS

BACKGROUND OF THE INVENTION

1. Field of the Invention

The present invention relates to the field of application performance and availability monitoring and more particularly to configuration item status value analysis.

2. Description of the Related Art

Decades ago, application performance and availability related mostly to the complexity of an application and the capabilities of its host platform. In view of the simplicity of the relationship between performance and resource availability, enhanced application performance could arise only through more efficient or less complex application coding, or through an enhanced hosting platform including more memory, more caching resources, faster fixed storage, or speedier processing. As a result, until recently, little attention had been paid to the performance of an application as an indicator of anything more than merely an overly complex application, or an underpowered host platform.

The popularization of more complex, enterprise computing environments has resulted in new efforts to explore the relationship between the state of a host platform and the performance and availability of a hosted application. To further explore the changing states of applications deployed within the enterprise, application performance monitoring systems have been developed whose purpose is to detect an impending state change of a monitored application. In furtherance of its purpose, typical performance monitoring systems can be coupled to monitored applications and can monitor resources which affect the operation of the host platform. Importantly, these resources can include both hardware and software constructs.

Generally intended for use by network and application administrators, enterprise computing monitoring systems monitor selected elements in the network of components forming the enterprise computing environment. Enterprise computing monitoring systems are traditionally organized in a hierarchical fashion, with sensors distributed throughout the network of components forming the enterprise computing environment. These sensors relay monitored events to aggregation nodes, which in turn can relay the monitored events to a smaller set of aggregation nodes. Monitored events can be interpreted, translated and provided to interacting administrators in order to facilitate the management, performance and availability, of the enterprise computing environment.

In the modern, complex, heterogeneous enterprises it is often the case that a single resource, also referred to as a configuration item (CI), is known and monitored by more than a single monitoring system or function. This is particularly true when considering the computer system as a composite of individual components or CIs, for example an operating system, a database management system, a network card, disk storage and memory, each of which may be monitored by multiple monitoring systems. Each of the monitoring systems monitoring the CIs typically specializes in monitoring some particular aspect of that CI.

Notably, the individual monitoring results from all the monitoring systems, each embodied as a CI status, can be useful and important when trying to understand the health or availability of a computing system. However, often it can be difficult to understand what information each monitoring system has attempted to convey to the end user in a CI status and how that information can be related to different information for the CI acquired from another concurrently monitoring system. Often the CI status from each of multiple monitoring systems can contradict each other, thus adding to the confusion and difficulty in interpreting and utilizing the information. Current solutions focus on aggregating the multiple CI status values into a single, composite value.

The aggregation of multiple CI status values tend to result in representing the resource status as the worst status reported by any monitoring system for the CI. In consequence, valuable information associated with individual CI status values for the resource will have been lost through the reconciliation of CI status values for the resource compiled by multiple different monitoring sources. By comparison, other less automated solutions require the end user to visually correlate CI status values from multiple monitoring systems. The latter solutions can be error prone and rely heavily upon the individual in understanding the information conveyed by each monitoring source.

BRIEF SUMMARY OF THE INVENTION

Embodiments of the present invention address deficiencies of the art in respect to multiple and concurrent CI status value analysis and provide a novel and non-obvious method, system and computer program product for CI status value analysis for multiple performance monitors. In one embodiment of the invention, a multi-CI analysis method can be provided. The method can include weighting different CI status values produced by different performance monitors for a single resource in a monitored computing system and displaying selected ones of the weighted different CI status values according to relevance determined by weight. In one aspect of the embodiment, weighting different CI status values produced by different performance monitors for a single resource in a monitored computing system can include locating the different CI status values for the single resource in a configuration management database (CMDB), identifying the different performance monitors producing the different CI status values in the CMDB and applying weights to the different CI status values according to CI status value characteristics.

Applying the weights to the different CI status values according to CI status value characteristics can include determining a class of CI associated with each of the CI status values, identifying a specialization for each of the performance monitors providing the CI status value, and weighting more heavily CI status values produced by performance monitors specializing in monitoring resources for the class of CI. Alternatively, applying weights to the different CI status values according to CI status value characteristics can include determining a time of observation for the different CI status values and weighting more heavily one of the CI status values in a causal relationship with another of the different CI status values determined from different times of observation for the CI status values. Yet further, applying weights to the different CI status values according to CI status value characteristics can include detecting both aberrant and nominal states reflected by the different CI status values, and weighting more heavily CI status values associated with the aberrant states. Finally, applying weights to the different CI status values according to CI status value characteristics can include identifying conflicting ones of the CI status values and weighting more heavily the conflicting ones of the CI status values.

In another embodiment of the invention, a performance monitoring data processing system can be provided. The system can include different performance monitors executing in a computer system and monitoring a single resource in a monitored system. The system further can include an analyzer executing in a computer system. The analyzer can include program code enabled to weight different status values produced by the different performance monitors for the single resource. In one aspect of the embodiment, a CMDB storing CI status values for corresponding CIs can be provided where each CI is associated with a different resource in the monitored system. As such, the CIs each can be associated with at least one of a central processing unit (CPU), a network interface, fixed storage and a database management system (DBMS).

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for CI status value analysis for multiple performance monitors. In an embodiment of the present invention, a CI can be classified by type and multiple performance monitors providing a CI status for the CI can be identified. For each identified performance monitor reporting a CI status for the CI, a CI status can be acquired and a time of acquisition of the CI status can be determined. Thereafter, the reported CI status for each identified performance monitor can be weighted according to a reported alert status, whether the identified performance monitor specializes in monitoring the type classified for the CI, whether the reported CI status directly conflicts with that of another performance monitor, or whether the reported CI status for the performance monitor temporally follows a reported CI status for another performance monitor to imply a causal relationship.

The resulting weights can be provided in a view for an end user and, in one aspect of the embodiment, the most heavily weighted CI status for a particular one of the performance monitors can be considered the mostly likely CI status experienced by an end user. In this way, the CI status information embodied by a single CI value produced by a single performance monitor need not be lost when aggregating multiple CI values from multiple different performance monitors into a composite value. In further illustration, FIG. 1 is a schematic illustration of an enterprise computing system configured for CI status value analysis for multiple performance monitors.

Figure 1:
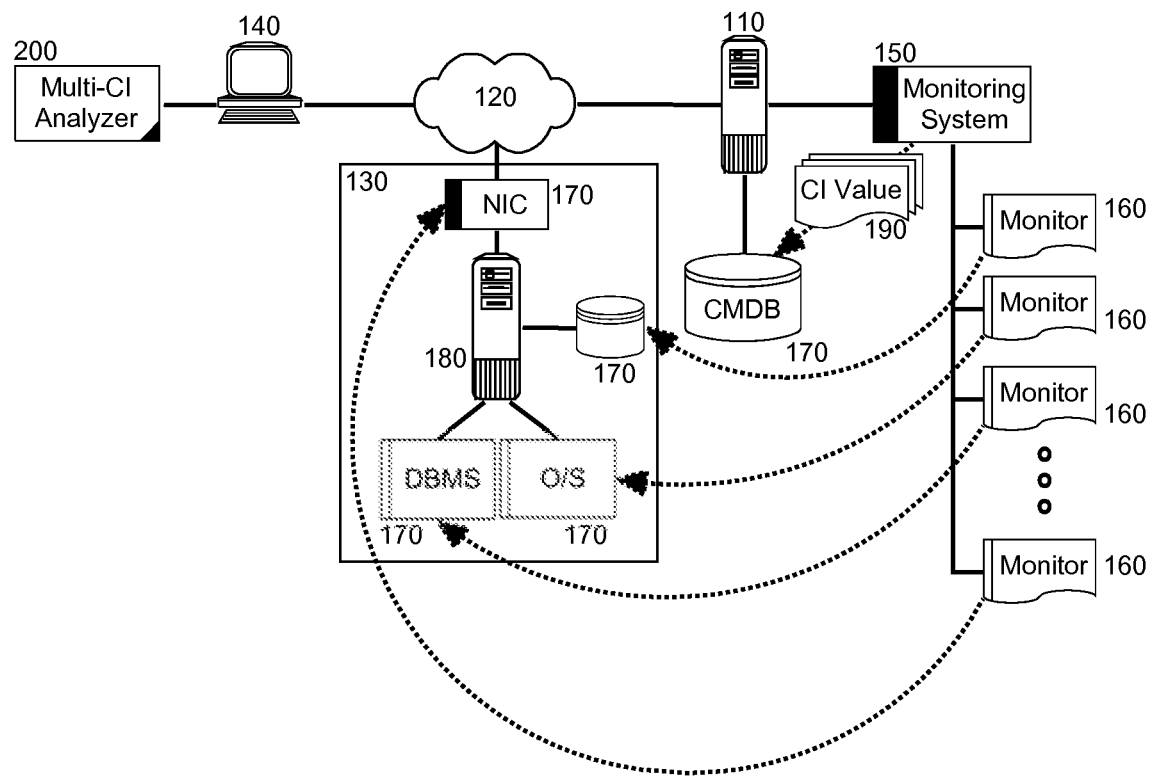
FIG. 1 is a schematic illustration of an enterprise computing system configured for CI status value analysis for multiple performance monitors; and, FIG. 2 is a flow chart illustrating a process for CI status value analysis for multiple performance monitors.

As shown in FIG. 1, a host platform 110 can support a performance monitoring system 150 including multiple different performance monitors 160 monitoring different resources 170 for a computing platform 180 in a computing system 130. The host platform 110 can be coupled to the computing system 130 over computer communications network 120 such that the individual performance monitors 160 can monitor the operation and performance of the different respective resources 170 remotely. The individual performance monitors 160 in turn can store status values 190 for different ones of the resources in a CMDB 170 in association with different CIs corresponding to individual ones of the resources 170 in the computing system 130. An individual performance monitor 160 can monitor and provide status values from multiple CIs, potentially overlapping with other performance monitors for the same CI.

Notably, a multi-CI analyzer 200 operating in computer 140 can be coupled to the monitoring system 150 through host platform 110 via computer communications network 120. The multi-CI analyzer 200 can include program code enabled to access the CMDB 170 to identify different stored CI values 190 for corresponding resources 170. The program code of the multi-CI analyzer 200 further can be enabled to identify the different performance monitors 160 associated with different CIs in the CMDB 170 for the different resources 170 in the computing system 130. Finally, the program code of the multi-CI analyzer 200 can be enabled to store a time value for each of the CI values 190 in the CMDB 170 indicating when the individual one of the CI values 190 had been observed by the different associated ones of the performance monitors 160 for the monitoring system 150.

In accordance with an embodiment of the present invention, an individual one of the CI status values 190 for a selected one of the resources 170 from one of the performance monitors 160 can be compared to individual ones of the CI status values 190 for the selected one of the resources 170 from others of the performance monitors 160. The CI status values 190 for the selected one of the resources 170 can be weighted against one another according to a number of factors. Those factors can include whether or not a particular one of the performance monitors 160 specializes in monitoring a corresponding one of the resources 170 for an associate one of CI status values 190. Those factors also can include the duration of time during which a given one of the performance monitors 160 has reported a non-green status for the corresponding one of the resources 170.

Other factors for weighting the CI status values 190 can include a determination of whether any one of the CI status values 190 reported by one of the performance monitors 160 directly counteracts or otherwise cancels another of the CI status values 190 reported by another of the performance monitors 160. Finally, another factor for weighting the CI status values 190 can include a timing of detecting one of the CI status values 190 for a given one of the resources 170 relative to a timing of detecting another of the CI status values 190 for the given one of the resources 170 in order to determine a causative relationship between the two ones of the CI status values 190.

Utilizing the weighted factors, a single one of the CI status values 190 for a corresponding single one of the resources 170 can be viewed as most important for viewing individually aside from a composition of the CI status values 190 for the single one of the resources 170. For instance, the most heavily weighted one of the CI status values 190 can be viewed as the most important. In any event, one or more of the CI status values 190 for the single one of the resources 170 can be rendered for viewing by an operator in the computer 140 in addition to a composition of the CI status values 190 for the single one of the resources 170.

Figure 2:
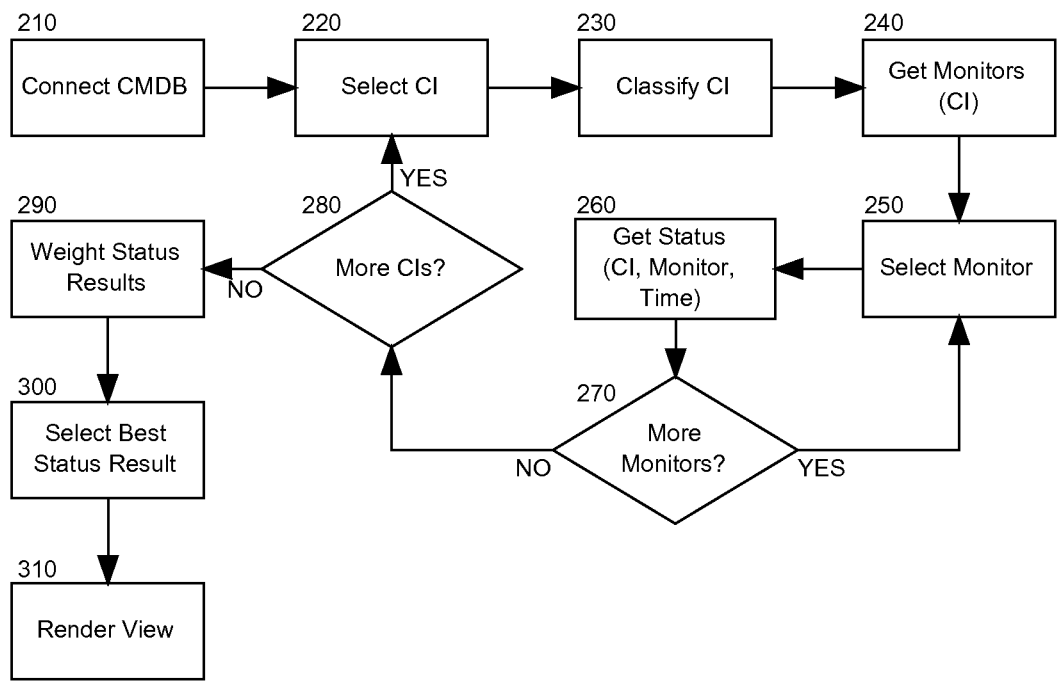

In yet further illustration, FIG. 2 is a flow chart illustrating a process for CI status value analysis for multiple performance monitors. Beginning in block 210, the multi-CI analyzer can connect to a CMDB for monitored resources in a monitored computing system. In block 220, a first CI can be selected in the CMDB and the selected CI can be classified according to resource type, such as network interface, database server, central processing unit (CPU), etc. Thereafter, in block 240 a list of performance monitors monitoring the CI can be acquired, for instance by querying the CMDB. Subsequently, in block 250 a first performance monitor can be selected for processing. In this regard, a CI status value for the CI from the performance monitor can be retrieved from the CMDB along with a time of observation for the CI status value.

In decision block 270, if additional monitors remain to be processed, the process can repeat through block 250 for a next selected monitor. When no further monitors remain to be processed, in decision block 280 it can be determined whether or not any additional CIs in the CMDB remain to be processed. If so, the process can repeat through block 220. Otherwise, the process can continue through block 290. In block 290, the CI status values for a given CI in the CMDB can be weighted according to a number of factors, including the classification of the CI in respect to the type of performance monitor and its specialization towards a given class of monitored resource. The factors further can include whether or not an observed CI status is nominal or aberrant, and whether two different observed CI status values counteract one another. Finally, the timing of observed CI status values can be used in weighting the CI status values in respect to a perceived causal relationship arising from timing data for the CI status values.

In block 300, one or more of the individual CI status values for a CI in the CMDB can be selected for display in addition to or in lieu of a composition of the CI status values. The selected individual CI status values can be selected and arranged according to the different weights with the most telling of CI status values being emphasized. Finally, in block 310 a view can be rendered with the selected individual CI status values along with user interface controls to re-render the CI status values according to a different exclusion or sorting filter.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method of analyzing multiple configuration item (CI) status values comprising:
   selecting a CI in a monitored computing system;
   obtaining different CI status values for the selected CI produced by different performance monitors;
   weighting the different CI status values for the selected CI according to predetermined factors by identifying conflicting ones of the different CI status values for the selected CI and weighting more heavily the conflicting ones of the different CI status values; and,
   displaying selected ones of the weighted different CI status values according to relevance determined by weight.

2. The method of claim 1, wherein weighting the different CI status values for the selected CI according to predetermined factors further comprises:
   locating the different CI status values for the selected CI in a configuration management database (CMDB); and,
   identifying the different performance monitors producing the different CI status values in the CMDB.

3. The method of claim 1, wherein weighting the different CI status values for the selected CI according to predetermined factors further comprises:
   determining a class of CI associated with each of the different CI status values;
   identifying a specialization for each of the performance monitors; and,
   weighting more heavily the different CI status values produced by performance monitors specializing in monitoring resources for the class of the selected CI.

4. The method of claim 1, wherein weighting the different CI status values for the selected CI according to predetermined factors further comprises:
   determining a time of observation for the different CI status values; and,
   weighting more heavily one of the different CI status values in a causal relationship with another of the different CI status values determined from different times of observation for the different CI status values.

5. The method of claim 1, wherein weighting the different CI status values for the selected CI according to predetermined factors further comprises:
   detecting both aberrant and nominal states reflected by the different CI status values; and,
   weighting more heavily different CI status values associated with the aberrant states.

6. The method of claim 1, wherein displaying selected ones of the weighted different CI status values according to relevance determined by weight, comprises displaying selected ones of the weighted different CI status values according to relevance determined by weight in addition to a composition of the different CI status values.

7. The method of claim 3, wherein determining the class of CI associated with each of the different CI status values includes classifying the selected CI according to resource type.

8. A performance monitoring data processing system for analyzing multiple configuration item (CI) status values comprising:
   A hardware processor configured to:
   select a CI in a monitored computing system;
   obtain different CI status values for the selected CI produced by different performance monitors;
   weight the different CI status values for the selected CI according to predetermined factors by identifying conflicting ones of the different CI status values for the selected CI and weighting more heavily the conflicting ones of the different CI status values; and,
   display selected ones of the weighted different CI status values according to relevance determined by weight.

9. The system of claim 8, further comprising a configuration management database (CMDB) storing different CI status values for corresponding CIs, each CI associated with a different resource in the monitored system.

10. The system of claim 9, wherein the CIs each are associated with at least one of a central processing unit (CPU), a network interface, a fixed storage and a database management system (DBMS).

11. The system of claim 9, wherein the different CI status values produced by the different performance monitors for the selected CI are weighted according to predetermined factors, the predetermined factors indicating an aberrant condition for the selected CI, conflicting different CI status values for the selected CI, different CI status values in a causal relationship with one another, and different CI status values produced by corresponding ones of the performance monitors specializing in monitoring resources classified similarly to the selected CI.

12. A computer program product comprising a non-transitory computer usable storage having stored therein computer usable program code for multi-configuration item (CI) analysis, the computer usable program code, which when executed by a computer hardware system, causes the computer hardware system to perform:
   selecting a CI in a monitored computing system;
   obtaining different CI status values for the selected CI produced by different performance monitors;
   weighting the different CI status values for the selected CI according to predetermined factors by identifying conflicting ones of the different CI status values for the selected CI and weighting more heavily the conflicting ones of the different CI status values; and,
   displaying selected ones of the weighted different CI status values according to relevance determined by weight.

13. The computer program product of claim 12, wherein weighting the different CI status values for the selected CI according to predetermined factors further comprises:
   locating the different CI status values for the selected CI in a configuration management database (CMDB); and,
   identifying the different performance monitors producing the different CI status values in the CMDB.

14. The computer program product of claim 12, wherein weighting the different CI status values for the selected CI according to predetermined factors further comprises:
   determining a class of CI associated with each of the different CI status values;
   identifying a specialization for each of the performance monitors; and
   weighting more heavily different CI status values produced by performance monitors specializing in monitoring resources for the class of CI.

15. The computer program product of claim 12, wherein weighting the different CI status values for the selected CI according to predetermined factors further comprises:
   determining a time of observation for the different CI status values; and,
   weighting more heavily one of the different CI status values in a causal relationship with another of the different CI status values determined from different times of observation for the different CI status values.

16. The computer program product of claim 12, wherein weighting the different CI status values for the selected CI according to predetermined factors further comprises:
   detecting both aberrant and nominal states reflected by the different CI status values; and,
   weighting more heavily different CI status values associated with the aberrant states.

17. The computer program product of claim 12, wherein the selected ones of the weighted different CI status values are displayed according to a composition of the different CI status values.

18. The method of claim 7, wherein the resource type is one of a network interface, a database server, a central processing unit, and a fixed storage.

19. The computer program product of claim 14, wherein determining the class of CI associated with each of the different CI status values includes classifying the selected CI according to resource type.

20. The computer program product of claim 19, wherein the resource type is one of a network interface, a database server, a central processing unit, and a fixed storage.

* * * * *